(12) United States Patent
Pedersen et al.

(10) Patent No.: US 8,623,303 B2
(45) Date of Patent: Jan. 7, 2014

(54) PROCESS FOR THE REMOVAL OF HYDROGEN CYANIDE AND FORMIC ACID FROM SYNTHESIS GAS

(75) Inventors: Karsten Pedersen, Dronningmølle (DK); Poul Erik Højlund Nielsen, Fredensborg (DK); Ib Dybkjær, Copenhagen K (DK); Jesper Nerlov, Værløse (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 12/298,869

(22) PCT Filed: Apr. 18, 2007

(86) PCT No.: PCT/EP2007/003397
§ 371 (c)(1),
(2), (4) Date: Nov. 24, 2008

(87) PCT Pub. No.: WO2007/124865
PCT Pub. Date: Nov. 8, 2007

(65) Prior Publication Data
US 2009/0074643 A1 Mar. 19, 2009

(30) Foreign Application Priority Data
Apr. 28, 2006 (DK) .................................. 2006 00606

(51) Int. Cl.
*B01D 53/86* (2006.01)
(52) U.S. Cl.
USPC .......................................... 423/210; 423/237
(58) Field of Classification Search
USPC .............................. 423/210, 236–237; 518/705
See application file for complete search history.

(56) References Cited

U.S. PATENT DOCUMENTS

| | | | |
|---|---|---|---|
| 4,521,387 A | 6/1985 | Broecker et al. | |
| 4,810,475 A | 3/1989 | Chu et al. | |
| 5,124,140 A * | 6/1992 | Okada et al. | 423/650 |
| 5,441,990 A * | 8/1995 | Robin et al. | 518/703 |
| 5,587,348 A * | 12/1996 | Brown et al. | 502/230 |
| 6,107,353 A | 8/2000 | Koveal et al. | |

(Continued)

FOREIGN PATENT DOCUMENTS

| | | | | |
|---|---|---|---|---|
| EP | 0293546 A2 * | 12/1998 | | B01J 8/04 |
| EP | 1 034 832 | 9/2000 | | |

(Continued)

OTHER PUBLICATIONS

N. Hickey et al., "Improvement of So$_x$-Resistance of Silver Lean-DeNO$_x$ Catalysts by Supporting on CeO$_2$-Containing Zirconia," *Journal of Catalysis* 209, pp. 271-274 (2002).

(Continued)

*Primary Examiner* — Stuart Hendrickson
*Assistant Examiner* — Richard M Rump
(74) *Attorney, Agent, or Firm* — Dickstein Shapiro LLP

(57) ABSTRACT

A process for the catalytic removal of hydrogen cyanide, formic acid and formic acid derivatives from synthesis gas comprising these compounds, carbon monoxide and hydrogen, the process comprising contacting the synthesis gas with a catalyst comprising one or more metals selected from the group consisting of silver, gold, copper, palladium, platinum and their mixtures and supported on a carrier comprising at least one of the oxides of scandium, yttrium, lanthanum, cerium, titanium, zirconium, aluminum, zinc, chromium and molybdenum.

9 Claims, 1 Drawing Sheet

(56) References Cited

U.S. PATENT DOCUMENTS

| | | | |
|---|---|---|---|
| 6,162,373 A * | 12/2000 | Koveal, Jr. | 252/373 |
| 7,323,151 B2 * | 1/2008 | Hansen et al. | 423/230 |
| 2004/0175327 A1 * | 9/2004 | Hagemeyer et al. | 423/656 |

FOREIGN PATENT DOCUMENTS

| EP | 1 034 832 A2 | 9/2000 |
|---|---|---|
| FR | 2 398 107 A1 | 2/1979 |
| JP | 53-5065 A | 1/1978 |
| WO | WO 2005/063384 | 7/2005 |
| WO | WO/2005/063384 | 7/2005 |

OTHER PUBLICATIONS

N. Hickey et al.; "Improvement of $SO_x$-Resistance of Silver Lean-$DeNO_x$ Catalysts by Supporting on $CeO_2$-Containing Zirconia," *Journal of Catalysis*, vol. 209; No. 1; 2002; pp. 271-274.

\* cited by examiner

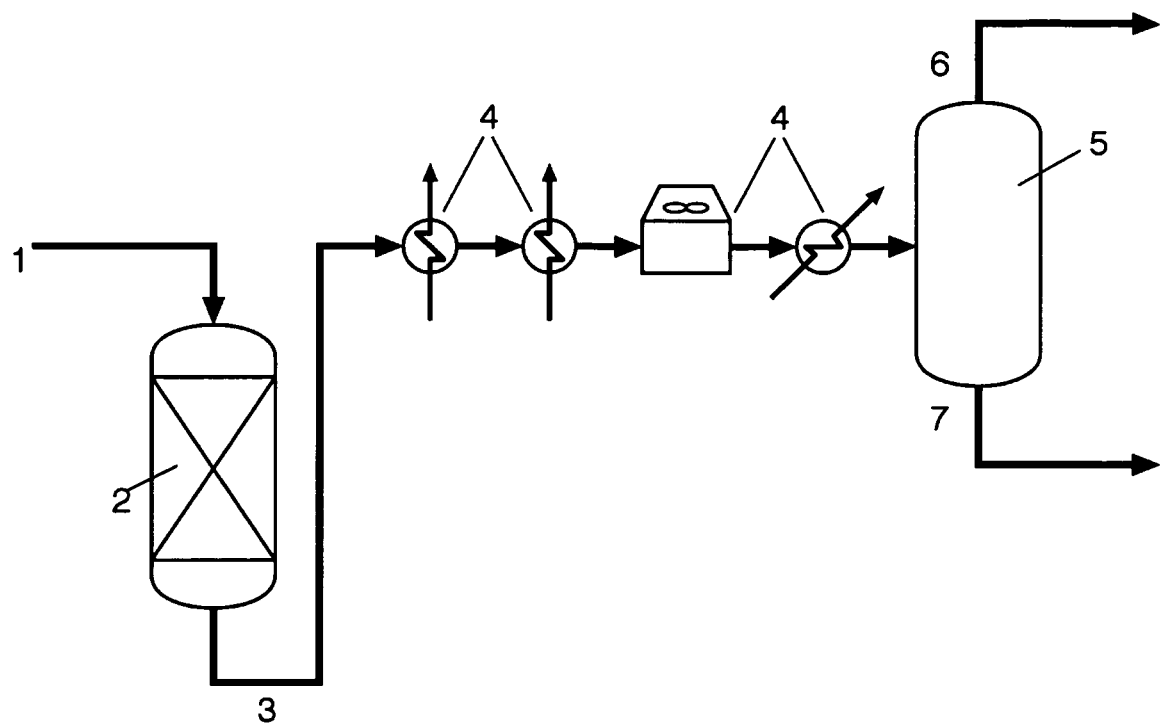

PROCESS FOR THE REMOVAL OF HYDROGEN CYANIDE AND FORMIC ACID FROM SYNTHESIS GAS

This invention deals with the removal of hydrogen cyanide and formic acid from a gas to produce a gas suitable for production of other compounds such as methanol, dimethyl ether or hydrocarbons. In particular the invention concerns the removal of these impurities via catalytic hydrolysis of the gas, for instance synthesis gas.

BACKGROUND OF THE INVENTION

Synthesis gas for production of for instance methanol, dimethyl ether (DME) or liquid hydrocarbons via for instance Fischer-Tropsch synthesis, may be produced from carbon-containing feedstock such as natural gas LPG, liquid hydrocarbons including heavy hydrocarbons, or solid feedstock such as coal. The carbon-containing feedstock is reacted with steam and/or air, enriched air, or oxygen at high temperature during steam reforming, autothermal reforming, catalytic partial oxidation or combinations thereof.

In the conventional steam reforming process natural gas or light hydrocarbons are reacted with steam in the presence of a catalyst based on nickel or noble metals. Temperatures at the reactor outlet of up to 950° C. are obtained.

During autothermal reforming (ATR) or catalytic partial oxidation (CPO), natural gas or other hydrocarbons are reacted with steam and an oxidant (air, enriched air, or oxygen) in the presence of a catalyst based on nickel or noble metals. Temperatures up to 1100° C. are usually obtained at the outlet of the reactor. During non-catalytic partial oxidation (POX) of natural gas, light hydrocarbons, heavy hydrocarbons or solid feedstock such as coal (also referred to as gasification) is reacted with an oxidant (air, enriched air or oxygen) and outlet temperatures from the reactor of up to 1400° C. are obtained.

These processes are well known to those experienced in the art. A comprehensive description of the individual processes and relevant variations and combinations thereof is given by e.g. Aasberg-Petersen et al. Fischer-Tropsch Technology, Stud. Surf. Sci. Catal. 152 (2004) 258-405, edited by Steynberg, A. P. and Dry, M. E.

In processes based on steam reforming and/or autothermal reforming or catalytic partial oxidation the composition of the synthesis gas may be an equilibrium mixture of hydrogen, carbon monoxide, carbon dioxide, methane and steam established at the outlet temperature and pressure of the last catalytic reactor according to the reactions:

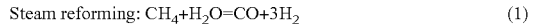

Steam reforming: $CH_4+H_2O=CO+3H_2$ (1)

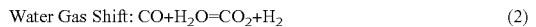

Water Gas Shift: $CO+H_2O=CO_2+H_2$ (2)

In partial oxidation the equilibrium may be established at a temperature somewhat lower than the outlet temperature from the reactor. Hydrocarbons other than $CH_4$ will generally be present in synthesis gas produced by any of the methods only in small or insignificant amounts. However, certain other components may also be present in trace amounts as impurities with possible detrimental effects in downstream processes, especially if the feedstock or the oxidant contains nitrogen. Impurities of special interest are ammonia, hydrogen cyanide and formic acid.

These impurities will be present in amounts corresponding to establishment of equilibrium (at the same conditions as the equilibrium for reactions (1) and (2)) for the following reactions:

$3H_2+N_2=2NH_3$ (3)

$CO+NH_3=HCN+H_2O$ (4)

$CO+H_2O=HCOOH$ (5)

The concentration of ammonia may be up to a few hundred vol ppm, whereas the concentration of hydrogen cyanide and formic acid will normally be less than 100 vol. ppm.

After leaving the reactor where the synthesis gas is formed, the raw synthesis gas is cooled in one or more steps to a temperature where most of its content of water vapour condenses. The first cooling step can be used to produce steam followed by cooling in air and/or water cooling. The condensate is separated, and the synthesis gas is sent to the section for synthesis of the final product e.g. methanol, dimethyl ether or hydrocarbons. The condensate will comprise dissolved gases including carbon oxides, most of the ammonia, and almost all of the formic acid. The pH of the condensate will typically be around 7.

Hydrogen cyanide will at this pH not be dissociated in the water, and it will be distributed between gas and condensate. The synthesis gas will thus, in addition to the main components hydrogen, carbon monoxide, carbon dioxide and methane, also contain traces of ammonia and hydrogen cyanide. The condensate will contain the dissolved gases comprising hydrogen cyanide, most of the ammonia and formic acid. This is undersirable since formic acid and formates are contaminants which are corrosive in downstream condensing units and cause additional load on water purification units or prevent reuse of condensate.

The content of ammonia, hydrogen cyanide and formic acid in both the synthesis gas and the condensate may cause problems in downstream process steps. In the synthesis of methanol or DME, ammonia and hydrogen cyanide may be converted to methyl amines, which are undesired in the products and must be removed, e.g. by ion exchange. A more serious effect is seen in hydrocarbon synthesis by Fischer-Tropsch reaction, especially when catalysts based on Co are used, see e.g. U.S. Pat. No. 6,107,353. In such cases, ammonia and hydrogen cyanide may act as catalyst poisons by unfavourably affecting the performance of the synthesis catalyst.

Traces of ammonia are easily removed by washing with water. Hydrogen cyanide in the gas is difficult to remove by washing since the solubility in water is limited at the prevailing conditions.

The condensate is most often purified by flashing and/or stripping with steam followed by final purification by ion exchange. A survey of various concepts for stripping of process condensate may be found in J. Madsen: Ammonia Plant Saf. 31 (1991) 227-240. The presence of hydrogen cyanide and of formic acid in the synthesis gas and the process condensate is thus undesirable.

The removal of hydrogen cyanide from gases is described in the literature. It is thus known that $Al_2O_3$ is able to convert HCN in town gas plants, see for instance: Hydrolysis of HCN on different oxidic catalysts at 400° C., J. D. F March, W. B. S Newling, J. Appl. Chem 2, 1952, 681/4.

JP patent application no. 53-5065 to Nitto Chemical Industry K.K. discloses a two step process for treating a hydrogen cyanide-containing waste gas. The waste gases result from processes using hydrogen cyanide such as ammoxidation, electroplating, metallurgy industries and others. The first step comprises hydrolysing hydrogen cyanide to ammonia and carbon monoxide in the presence of a hydrolysis catalyst containing at least one element selected from the group consisting of aluminium, molybdenum, vanadium, iron, cobalt, nickel, copper, manganese, silver and lanthanum. The hydrolysing catalyst is preferably active alumina. Preferable is also alumina, MgO or TiO$_2$ carrying alkali and/or alkaline earth metals. The second step is an oxidation step whereby ammonia and carbon monoxide are converted to nitrogen and carbon dioxide in the presence of an oxidation catalyst.

Examples are given in which the hydrolysis catalyst is alumina impregnated with either lanthanum nitrate, chloroplatinic acid or palladium chloride.

U.S. Pat. No. 6,107,353 discloses the removal of hydrogen cyanide in a catalysed hydrolysis step followed by a scrubbing step for removal of the ammonia formed. The hydrolysis catalyst comprises alumina, oxides of molybdenum and titanium in specific amounts.

The problems associated with the presence of formic acid in the condensate and the possible formation of formic acid in the catalytic reactor by reaction (5) are not discussed in the above disclosures and no solution is provided to this problem.

It is therefore an objective of the invention to provide a process by which hydrogen cyanide is removed from the wet synthesis gas before water vapour is condensed so that the content of hydrogen cyanide in both the dry synthesis gas and the condensate is reduced to a lower level.

Another objective of the invention is to provide a process which, in addition to the removal of hydrogen cyanide from the synthesis gas, also removes the formic acid and its derivatives formed in the synthesis gas generator by reaction (5).

SUMMARY OF THE INVENTION

It has now surprisingly been possible to develop a process which simultaneously decomposes both hydrogen cyanide according to reaction (6) and formic acid according to reaction (7) catalytically without promoting reactions such as methanation according to reaction (8) or the shift reaction according to reaction (2). Hydrogen cyanide is decomposed to carbon monoxide and formic acid is decomposed to carbon dioxide and hydrogen. These shift and methanation reactions can in some cases be undesirable since they could change the overall composition of the synthesis gas in a negative manner and cause loss of production capacity.

$$CO+H_2O=CO_2+H_2 \quad (2)$$

$$CO+3H_2=CH_4+H_2O \quad (8)$$

Such removal of hydrogen cyanide and formic acid can be effected by a process which in addition to the decomposition of hydrogen cyanide according to reaction (6), also decomposes formic acid via dehydrogenation, e.g. according to reaction (7):

$$HCN+H_2O=CO+NH_3 \quad (6)$$

$$HCOOH=CO_2+H_2 \quad (7)$$

The process of the invention concerns the catalytic removal of hydrogen cyanide, formic acid and formic acid derivatives from synthesis gas comprising these compounds, carbon monoxide and hydrogen, the process comprising contacting the synthesis gas with a catalyst comprising one or more metals selected from the group consisting of silver, gold, copper, palladium, platinum and their mixtures, and supported on a carrier comprising at least one of the oxides of scandium, yttrium, lanthanum, cerium, titanium, zirconium, aluminium, zinc, chromium and molybdenum.

By applying the process of the invention the content of hydrogen cyanide and formic acid and formic acid derivatives in the form of formats and formamide in synthesis gas and process condensate is reduced.

The invention also includes novel catalysts comprising one or more metals selected from the group consisting of silver, gold, copper, palladium, platinum and their mixtures and supported on a carrier comprising at least one of the oxides of scandium, yttrium, lanthanum, cerium, titanium, zirconium, aluminium, zinc, chromium and molybdenum.

SUMMARY OF THE DRAWINGS

FIG. 1 shows an embodiment of the process of the invention.

DETAILED DESCRIPTION OF THE INVENTION

The process of the invention relates to the removal of the impurities hydrogen cyanide and formic acid. By formic acid is also meant derivatives of formic acid in the form of formamide, formates such as salts formed from the neutralisation of formic acid with a base, or as an ester derived from formic acid. The formate ion has the formula HCOO$^-$.

The process of the invention employs a specific catalyst for the simultaneous decomposition of hydrogen cyanide and formic acid present in synthesis gas. The catalyst catalyses the hydrolysis reaction of hydrogen cyanide and the decomposition of formic acid and its derivatives via a dehydrogenation reaction. The catalyst comprises at least one of the metals silver, gold, copper, palladium, platinum and their mixtures. The metal can be in the oxide form. The metal or metal oxide is supported on a carrier selected from the group of oxides of scandium, yttrium, lanthanum, cerium, titanium, zirconium, aluminium, zinc, chromium, molybdenum and mixtures thereof. Application of this catalyst in the process of the invention results in reduced amounts of hydrogen cyanide and formic acid and derivatives in the treated synthesis gas as compared to the untreated synthesis gas.

The catalyst comprises the metal at concentrations of 0.01 to 40 wt %. Preferable is 0.05 to 20 wt %. Preferably the metals are palladium or silver, and most preferably the metal is silver.

The catalyst comprises the carriers prepared from oxides of scandium, yttrium, lanthanum, cerium, titanium, zirconium, aluminium, zinc, chromium, molybdenum and their mixtures. Preferable are carriers based on oxides of cerium, zirconium, aluminium, molybdenum, titanium and their mixtures. Most preferable are carriers of titania or titanium dioxide TiO$_2$ and zirconia or zirconium oxide ZrO$_2$ or their mixtures. The pure compounds or commercially available products are useful in the preparation of all the carriers.

All forms of titania are useful for example titania in anatase form.

A preferable embodiment of the invention is the process utilising a catalyst comprising silver deposited on titanium oxide and/or zirconium oxide. These catalysts are particularly effective for the simultaneous removal of both hydrogen cyanide and formic acid and its derivatives.

The hydrolysis reaction is carried out at temperatures of 100-400° C. and pressures of 1-100 bars. Most preferable is a temperature of 50-350° C. and a pressure of 1-80 bars. This temperature range is optimal as the water gas shift reaction can then be essentially avoided and these pressures are applicable for the further preparation of methanol or DME or liquid hydrocarbon synthesis via the Fischer-Tropsch process. At the lower temperatures lower activity may be experienced and it may therefore be desirable to increase the metal content of the catalyst. The lower temperatures are generally determined by the dew point of the reactant mixture, which normally is in the range from 50-200° C.

The process of the invention may be carried out in a reactor of the radial flow converter type. Another suitable reactor type contains several adiabatic beds in parallel. After ended hydrolysis of hydrogen cyanide and decomposition reaction of formic acid the process gas can be cooled in one or more steps and separated into a synthesis gas stream suitable for further processing to for instance methanol, DME and/or liquid hydrocarbons, and a condensate stream containing dissolved gases. The condensate stream can be sent to a stripper for further separation of the components.

FIG. 1 shows a preferred embodiment of the invention. Synthesis gas 1 with main components carbon monoxide, carbon dioxide and hydrogen and contaminated with impurities hydrogen cyanide and formic acid and formic acid derivatives is transferred to a hydrogen cyanide decomposition reactor 2 for the catalytic hydrolysis of hydrogen cyanide to carbon monoxide and ammonia and the simultaneous decomposition of formic acid to carbon dioxide and hydrogen. The process gas 3 from the hydrogen cyanide decomposition reactor 2 is cooled in one or more cooling steps 4 to a temperature below the temperature required for water vapour condensation. The heat generated during the cooling steps can be used in for instance the production of steam or as heat source in heat exchange reformers, for heating of boiler feed water or for other purposes.

The cooled process gas 3 is then transferred to a separator 5 for separation into two streams: a cleaned synthesis gas stream 6 suitable for further conversion and a condensate stream 7. The condensate stream 7 can be further purified by transferring it to for instance a stripper for removal of carbon dioxide, ammonia and other dissolved gases. The contents of hydrogen cyanide and formic acid and its derivatives will be reduced compared to a process which is not carried out according to the invention.

The cleaned synthesis gas stream is suitable for further conversion to for instance methanol and/or dimethyl ether. It can also be used as a starting material for the synthesis of hydrocarbons via the Fischer-Tropsch process. It is desirable that the amount of hydrogen cyanide is reduced in the synthesis gas by at least 80%, preferably 90% and most preferably 95% using the process of the invention. Likewise it is desirable that the total amount of formic acid and derivatives in the synthesis gas and the condensate is reduced by preferably more than 25% and most preferably by more than 50% using the process of the invention.

The catalyst may be prepared by depositing suitable sources of the metals on a metal oxide of the desired carrier. Deposition can be by impregnation or incipient wetness techniques. The support deposited with the metal is then dried and calcined at temperatures from about 250-500° C. to produce the oxide form. Temperatures of 350-450° C. are preferable. The catalyst may be treated with hydrogen at a temperature of 200-600° C. from 1-24 hours. Preferable is a temperature of 230-550° C.

The catalyst may also be prepared by mixing a solution of salts of the metal with the support to form a paste, which can be extruded. The resulting catalytic material is then dried and calcined at temperatures of 250-500° C. to produce the oxide form as mentioned earlier.

The catalyst may be prepared by depositing the metal on the support in the form of a monolith support or on pellets.

Metal salts for instance nitrates are suitable for use in the process of the invention. Other compounds such as metal complexes are also useful e.g. $[Pd(NH_3)_4](HCO_3)_2$ and $[Au(NH_3)_4(NO_3)_3]$.

Catalysed hardware in the form of a structured element with a catalytic layer is suitable for use in the process of the invention. Two types of structured elements are particularly suitable for the inventive process—the straight-channelled elements and the cross-corrugated elements.

Other catalysed structured elements can also be applied in the process of the invention. They can e.g. be catalyst pellets, catalyst attached to the tube wall or catalyst attached to structures attached to the reactor tube wall. The catalyst can also be in the form of a coating on the tube wall of a boiler or a boiler feed water preheater.

EXAMPLES

Experiments with different catalysts were carried out using a synthesis gas consisting mainly of hydrogen, carbon monoxide, carbon dioxide having a composition corresponding to that of a synthesis gas from an autothermal reforming unit.

The impurities were prepared as follows: hydrogen cyanide was produced by acid distillation of sodium cyanide. The formic acid used was a 32% formic acid solution of an analytical grade. The ammonia used was a 25% ammonia solution (analytical grade).

The impurities hydrogen cyanide, ammonia and formic acid were then added to the feed water to the evaporator to the test unit. The amounts of impurities in the synthesis gas corresponded to the amounts expected in a synthesis gas from an autothermal reforming unit. The resulting steam with the content of impurities from the evaporator was mixed with the synthesis gas to form a test gas tested in the test unit.

In all the examples the gas composition is given in either volume %, volume ppb or volume ppm.

The composition of the test gas is shown in Table 1:

TABLE 1

| Components of test gas | | Concentration | |
|---|---|---|---|
| | | Examples 1-6 | Examples 7-16 |
| $H_2$ | [%] | 45-60 | 45-60 |
| $H_2O$ | [%] | 10-20 | 15-25 |
| CO | [%] | 23-36 | 25-30 |
| $CO_2$ | [%] | 2-3 | 0 |
| Ar | [%] | 0-3 | 0 |
| Total | [%] | 100 | 100 |
| Impurities: | | | |
| HCN | ppb | 1700-4500 | 7000-12000 |
| HCOOH | ppb | 300-1900 | 13000-18000 |
| $NH_3$ | ppm | 164 | 164 |

The experiments were carried out at 1-28 bars in the temperature range of 150-350° C.

The concentrations of the CO, formic acid and derivatives and hydrogen cyanide in the wet gas were calculated on basis of the feed flow of dry gas and water and the dry gas analysis of the inlet and the exit gas of the reactor.

The ratios for CO, HCN and HCOOH are as follows:

| | |
|---|---|
| CO ratio = | $CO_{exit}/CO_{inlet}$ |
| HCN ratio = | $HCN_{exit}/HCN_{inlet}$ |
| HCOOH ratio = | $HCOOH_{exit}/HCOOH_{inlet}$ |

The ratio for HCOOH covers both formic acid and its derivatives.

Formic acid and its derivatives are found in the liquid phase after condensation of the wet gas. The concentration in the liquid phase is determined by ion chromatography, with a detection limit of about 0.1 mg/l.

Hydrogen Cyanide is found both in the aqueous phase and in the gas phase after condensation of the wet gas. The gas phase concentration of HCN was measured by absorption in an impinger bottle with alkaline liquid having a pH higher than 12. The absorption was performed for a specified time, and the volume of gas after the absorption was measured with a gasometer. The amount absorbed in the impinger bottle was found by ion selective chromatography with a detection limit of about 0.1 mg/l.

The water phase condensate was sampled in a bottle with 1 grain solid NaOH in order to prevent HCN from escaping the liquid upon expansion. The sample was analyzed likewise.

The catalysts tested were produced by impregnation of the calcined porous oxide carrier with the metals or by mixing and kneading the components followed by extrusion and calcination. The metals were used in the form of an aqueous solution. The concentration of the aqueous solutions was dependant on the desired metal concentration in the final catalyst and the pore volume of the catalysts, which was ranging from 230-600 ml/kg catalyst carrier. The surface area was ranging from 64-250 and had no marked effect on the results.

The wet impregnated catalysts were dried at 100° C. for 1 hour followed by calcination at 500° C. for 2 hours.

Example 1

Comparative

Gamma-alumina $Al_2O_3$ was tested as a catalyst using 3-9 mm pellets. It was observed that alumina was able to decompose HCN. However it also formed formic acid and formates via the reaction:

$$CO + H_2O = HCOOH \quad (5)$$

The amount of HCOOH present covers the presence of both formic acid and its derivatives. The results are shown in table 2.

TABLE 2

| $Al_2O_3$ Catalyst: | | |
|---|---|---|
| Temperature | deg C. | 318 |
| Pressure | Bar | 25 |
| Catalyst volume | ml | 15 |
| Space velocity | Nl/l/h | 11708 |
| INLET GAS COMPOSITION WET: | | |
| $H_2$ | % | 51.7 |
| CO | % | 31.1 |
| $CO_2$ | % | 2.3 |
| $H_2O$ | % | 14.9 |
| HCN in wet gas | Ppb | 1760 |
| HCOOH | Ppb | 316 |
| EXIT GAS COMPOSITION WET: | | |
| CO | % | 30.6 |
| HCN | Ppb | 39 |
| HCOOH | Ppb | 10160 |
| CO ratio | | 0.984 |
| HCN ratio | | 0.022 |
| HCOOH ratio | | 32.15 |

At the test conditions it is observed that alumina catalyst shifts approximately 1.4% of the carbon monoxide which is undesired. Furthermore it is seen that the HCOOH ratio is 32 indicating a significant formation of formic acid and the derivatives.

Example 2

Comparative

Titania in the form of anatase was tested as a catalyst using 3-9 mm pellets under the same reaction conditions as in example 1. The results are shown in table 3:

TABLE 3

| $TiO_2$ Catalyst | | |
|---|---|---|
| Temperature | deg C. | 272 |
| Pressure | Bar | 28 |
| Catalyst volume | ml | 35.10 |
| Space velocity | Nl/l/h | 24028 |
| INLET GAS COMPOSITION WET | | |
| $H_2$ | % | 59.4 |
| CO | % | 23.6 |
| $CO_2$ | % | 0.0 |
| $H_2O$ | % | 17.0 |
| HCN in wet gas | Ppb | 3584 |
| HCOOH | Ppb | 1862 |
| EXIT GAS COMPOSITION WET | | |
| CO | % | 23.6 |
| HCN | Ppb | 244 |
| HCOOH | Ppb | 20953 |
| CO ratio | | 1.000 |
| HCN ratio | | 0.068 |
| HCOOH ratio | | 11.25 |

$TiO_2$ is a more efficient catalyst for conversion of HCN, but formic acid and derivatives are also formed, as shown in table 3. It is seen that the HCOOH ratio is 11 indicating formation of formic acid and its derivatives. There is practically no water gas shift reaction using $TiO_2$

Example 3

7 wt % silver on titania was made by impregnation of porous 3 mm titania pellets with an aqueous solution containing 22.1 g silver nitrate per 100 ml solution. The impregnated titania was dried at 110° C. followed by decomposition of the silver nitrate at 500° C. for 1 hour. The catalyst was tested under the similar reaction conditions as in example 1 at both low and high space velocity. The results are shown in table 4:

TABLE 4

| 7 wt % $Ag/TiO_2$ Catalyst | | | |
|---|---|---|---|
| Temperature | deg C. | 322 | 322 |
| Pressure | Bar | 25 | 25 |
| Catalyst volume | ml | 5.30 | 5.30 |
| Space velocity | Nl/l/h | 35640 | 3573 |
| INLET GAS COMPOSITION WET | | | |
| $H_2$ | % | 47.1 | 45.5 |
| CO | % | 35.5 | 34.2 |
| $CO_2$ | % | 2.5 | 2.5 |
| $H_2O$ | % | 14.9 | 17.8 |
| HCN in wet gas | Ppb | 3450 | 4126 |
| HCOOH | Ppb | 2741 | 3278 |

TABLE 4-continued

| EXIT GAS COMPOSITION WET | | | |
|---|---|---|---|
| CO | % | 34.4 | 27.6 |
| HCN | Ppb | 26 | 138 |
| HCOOH | Ppb | 1225 | 1186 |
| CO ratio | | 0.969 | 0.807 |
| HCN ratio | | 0.008 | 0.033 |
| HCOOH ratio | | 0.447 | 0.362 |

The addition of silver to $TiO_2$ reduces the concentration of formic acid and derivatives as shown in table 4 by more than 60%.

There is some water gas shift reaction taking place on the catalyst.

Example 4

Example 3 was repeated at a lower temperature at both low and high space velocity using 7 wt % Ag on $TiO_2$ using 3-9 mm pellets. The results are shown in table 5.

TABLE 5

| 7 wt % Ag/TiO2 Catalyst | | | |
|---|---|---|---|
| Temperature | deg C. | 182 | 181 |
| Pressure | Bar | 25 | 25 |
| Catalyst volume | ml | 5 | 5 |
| Space velocity | Nl/l/h | 35449 | 3311 |
| INLET GAS COMPOSITION WET | | | |
| $H_2$ | % | 47.1 | 44.7 |
| CO | % | 35.4 | 33.7 |
| $CO_2$ | % | 2.5 | 2.4 |
| $H_2O$ | % | 15.0 | 19.2 |
| HCN in wet gas | ppb | 3465 | 4452 |
| HCOOH | ppb | 2753 | 3537 |
| EXIT GAS COMPOSITION WET | | | |
| CO | % | 35.3 | 33.4 |
| HCN | ppb | 373 | 41 |
| HCOOH | ppb | 762 | 1392 |
| CO ratio | | 0.997 | 0.991 |
| HCN ratio | | 0.108 | 0.009 |
| HCOOH ratio | | 0.277 | 0.394 |

The results indicated that the content of HCN and formic acid and its derivatives were effectively reduced. The shift reaction was also less prevalent.

Example 5

0.2 wt % Ag on a $TiO_2$ monolith was made by impregnation of a porous monolith having very small channels with a hydraulic diameter of 1.1 mm. The impregnation was made by using an aqueous solution of 0.6 g silver nitrate per 100 ml solution. The monolith was dried at 110° C. followed by calcination at 500° C. for 1 hour in order to decompose the silver nitrate. The silver containing monolith was compared to a $TiO_2$ monolith catalyst without silver. The experiment was carried out at both low and high space velocity and at two different temperatures. The results are shown in table 6.

TABLE 6

| Catalyst | | $TiO_2$ monolith (comparative) | | 0.2% Ag on $TiO_2$ monolith | |
|---|---|---|---|---|---|
| Temperature | deg C. | 290 | 290 | 195 | 192 |
| Pressure | Bar | 28 | 28 | 28 | 28 |
| Catalyst volume | Ml | 19 | 19.34 | 19 | 19 |
| Space velocity | Nl/l/h | 43607 | 43607 | 43607 | 4087 |
| INLET GAS COMPOSITION WET | | | | | |
| $H_2$ | % | 59.4 | 59.5 | 59.5 | 59.5 |
| CO | % | 23.6 | 23.5 | 23.5 | 23.5 |
| $CO_2$ | % | 0.0 | 0.0 | 0.0 | 0.0 |
| $H_2O$ | % | 17.0 | 17.0 | 17.0 | 17.0 |
| HCN in wet gas | Ppb | 4427 | 4427 | 4427 | 4428 |
| HCOOH | Ppb | 1862 | 1862 | 1862 | 1863 |
| EXIT GAS COMPOSITION WET | | | | | |
| CO | % | 23.5 | 23.5 | 23.5 | 23.5 |
| HCN | Ppb | 320 | 312 | 599 | 14 |
| HCOOH | Ppb | 17494 | 1131 | 599 | 1331 |
| CO ratio | | 0.996 | 1.000 | 1.000 | 1.000 |
| HCN ratio | | 0.072 | 0.070 | 0.135 | 0.003 |
| HCOOH ratio | | 9.395 | 0.607 | 0.322 | 0.714 |

It is seen that addition of silver on a $TiO_2$ monolith reduced the concentration of formic acid and derivatives to a value below the concentration in the feed.

Example 6

Example 4 was repeated with a catalyst containing a lower concentration of silver. 1.8 wt % Ag on $TiO_2$ was used. The catalyst was made by impregnation of porous 3 mm titania pellets with an aqueous solution containing 5.4 g silver nitrate per 100 ml solution. The impregnated titania was dried at 110° C. followed by decomposition of the silver nitrate at 500° C. for 1 hour. The results are shown in table 7.

TABLE 7

1.8 wt % Ag/TiO$_2$ Catalyst

| | | | |
|---|---|---|---|
| Temperature | deg C. | 195 | 195 |
| Pressure | Bar | 28 | 28 |
| Catalyst volume | ml | 27.23 | 27.23 |
| Space velocity | Nl/l/h | 30975 | 5608 |
| INLET GAS COMPOSITION WET | | | |
| H$_2$ | % | 55.3 | 55.3 |
| CO | % | 23.6 | 23.6 |
| CO$_2$ | % | 4.1 | 4.1 |
| H$_2$O | % | 17.0 | 17.0 |
| HCN in wet gas | ppb | 3630 | 3620 |
| HCOOH | ppb | 798 | 796 |
| EXIT GAS COMPOSITION WET | | | |
| CO | % | 23.6 | 23.6 |
| HCN | ppb | 116 | 66 |
| HCOOH | ppb | 333 | 199 |
| CO ratio | | 1.000 | 1.000 |
| HCN ratio | | 0.032 | 0.018 |
| HCOOH ratio | | 0.417 | 0.250 |

It is seen from table 7 that the ability to reduce the amount of formic acid and derivatives and hydrogen cyanide is maintained. The shift reaction is reduced.

Example 7

An Ag/Y$_2$O$_3$/Al$_2$O$_3$ catalyst was prepared as follows: 40 g Y$_2$O$_3$ was mixed with 25 g alumina gel and 1.8 g AgNO$_3$ dissolved in 1 ml H$_2$O. The mixture was kneaded to a paste, which was extruded. The extrudates were dried at 110° C. for 16 h, hereafter calcined at 500° C. for 2 h. The Ag content of the sample was analyzed by ICP as 2.2 wt %. The carrier contained 88 wt % Y$_2$O$_3$ and 12 wt % Al$_2$O$_3$. For the catalytic test, the extrudates were crushed to a particle size of 150-300 µm. The results are shown in Table 8.

TABLE 8

2.2 wt % Ag/Y$_2$O$_3$/Al$_2$O$_3$ Catalyst:

| | | |
|---|---|---|
| Temperature | deg C. | 185 |
| Pressure | Bar | 28 |
| Catalyst volume | Ml | 0.203 |
| Space velocity, wet | Nl/h/m3 | 73500 |
| INLET GAS COMPOSITION WET: | | |
| H$_2$ | % | 53.1 |
| CO | % | 27.4 |
| CO$_2$ | % | 0 |
| H$_2$O | % | 19.5 |
| HCN in wet gas | ppb | 11088 |
| HCOOH | ppb | 13422 |
| EXIT GAS COMPOSITION WET: | | |
| CO | % | 27.4 |
| HCN | ppb | 2180 |
| HCOOH | ppb | 1267 |
| CO ratio | | 1.000 |
| HCN ratio | | 0.197 |
| HCOOH ratio | | 0.094 |

It can be seen from Table 8 that the content of hydrogen cyanide, formic acid and formic acid derivatives was reduced.

Example 8

An Pd/Y$_2$O$_3$/Al$_2$O$_3$ catalyst was prepared as follows: 80 g Y$_2$O$_3$ was mixed with 50 g alumina gel and 2.8 g [Pd(NH$_3$)$_4$](HCO$_3$)$_2$ dissolved in 5 ml diluted nitric acid. The mixture was kneaded to a paste, which was extruded. The extrudates were dried at 110° C. for 16 h, hereafter calcined at 500° C. for 2 h. The Pd content of the sample was analyzed by ICP as 0.91 wt %. The carrier contained 88 wt % Y$_2$O$_3$ and 12 wt % Al$_2$O$_3$. For the catalytic test, the extrudates were crushed to a particle size of 150-300 µm. The results are shown in Table 9.

TABLE 9

0.91 wt % Pd/Y$_2$O$_3$/Al$_2$O$_3$ Catalyst:

| | | |
|---|---|---|
| Temperature | deg C. | 185 |
| Pressure | Bar | 28 |
| Catalyst volume | Ml | 0.202 |
| Space velocity, wet | Nl/h/m3 | 73900 |
| INLET GAS COMPOSITION WET: | | |
| H$_2$ | % | 53.1 |
| CO | % | 27.4 |
| CO$_2$ | % | 0 |
| H$_2$O | % | 19.5 |
| HCN in wet gas | ppb | 11088 |
| HCOOH | ppb | 13422 |
| EXIT GAS COMPOSITION WET: | | |
| CO | % | 27.4 |
| HCN | ppb | 1391 |
| HCOOH | ppb | 1405 |
| CO ratio | | 1.000 |
| HCN ratio | | 0.125 |
| HCOOH ratio | | 0.105 |

It can be seen from Table 9 that the content of hydrogen cyanide, formic acid and formic acid derivatives was reduced.

Example 9

An Ag/CeO$_2$/ZrO$_2$ catalyst was prepared as follows: 580 g Ce(NO$_3$)$_3$.6H$_2$O was dissolved in water to a total volume of 400 ml. A solution of 70 wt % Zr(OCH(CH$_3$)$_2$)$_4$ in 1-propanol (160 g) was diluted to a total volume of 600 ml with 2-propanol. The aqueous solution was quickly added to the alcohol solution during turbo mixing. The precipitate was filtered off, washed, dried and calcined at 500° C. for 5 h. Hereafter the support was impregnated with an aqueous solution of AgNO$_3$ to incipient wetness. The catalyst was dried at 120° C. and calcined at 450° C. for 2 h. The Ag content of the sample was analyzed by ICP as 1.5 wt %. The carrier contained 85 wt % CeO$_2$ and 15 wt % ZrO$_2$. For the catalytic test, the extrudates were crushed to a particle size of 150-300 µm. The results are shown in Table 10.

TABLE 10

1.5 wt % Ag/CeO$_2$/ZrO$_2$ Catalyst:

| | | |
|---|---|---|
| Temperature | deg C. | 185 |
| Pressure | Bar | 28 |
| Catalyst volume | ml | 0.203 |
| Space velocity, wet | Nl/h/m3 | 73700 |
| INLET GAS COMPOSITION WET: | | |
| H$_2$ | % | 53.1 |
| CO | % | 27.4 |
| CO$_2$ | % | 0 |
| H$_2$O | % | 19.5 |
| HCN in wet gas | ppb | 11088 |
| HCOOH | ppb | 13422 |
| EXIT GAS COMPOSITION WET: | | |
| CO | % | 27.4 |
| HCN | ppb | 817 |
| HCOOH | ppb | 158 |
| CO ratio | | 1.000 |

TABLE 10-continued

| | | |
|---|---|---|
| HCN ratio | | 0.074 |
| HCOOH ratio | | 0.012 |

It can be seen from Table 10 that the content of hydrogen cyanide, formic acid and formic acid derivatives was reduced.

Example 10

A $Pt/CeO_2/ZrO_2$ catalyst was prepared as follows: 580 g $Ce(NO_3)_3.6H_2O$ was dissolved in water to a total volume of 400 ml. A solution of 70 wt % $Zr(OCH(CH_3)_2)_4$ in 1-propanol (160 g) was diluted to a total volume of 600 ml with 2-propanol. The aqueous solution was quickly added to the alcohol solution during turbo mixing. The precipitate was filtered off, washed, dried and calcined at 500° C. for 5 h. Hereafter the support was impregnated with an aqueous solution of [Pt(NH$_3$)$_4$](HCO$_3$)$_2$ to incipient wetness. The catalyst was dried at 120° C. and calcined at 450° C. for 2 h. The Pt content of the sample was analyzed by ICP as 3.4 wt %. The carrier contained 85 wt % $CeO_2$ and 15 wt % $ZrO_2$. For the catalytic test, the extrudates were crushed to a particle size of 150-300 µm. The results are shown in Table 11.

TABLE 11

| 3.4 wt % $Pt/CeO_2/ZrO_2$ Catalyst: | | |
|---|---|---|
| Temperature | deg C. | 185 |
| Pressure | Bar | 28 |
| Catalyst volume | ml | 0.204 |
| Space velocity, wet | Nl/h/m3 | 73300 |
| INLET GAS COMPOSITION WET: | | |
| $H_2$ | % | 53.1 |
| CO | % | 27.4 |
| $CO_2$ | % | 0 |
| $H_2O$ | % | 19.5 |
| HCN in wet gas | ppb | 11088 |
| HCOOH | ppb | 13422 |
| EXIT GAS COMPOSITION WET: | | |
| CO | % | 27.4 |
| HCN | ppb | 455 |
| HCOOH | ppb | 6825 |
| CO ratio | | 1.000 |
| HCN ratio | | 0.041 |
| HCOOH ratio | | 0.508 |

It can be seen from Table 11 that the content of hydrogen cyanide, formic acid and formic acid derivatives was reduced.

Example 11

A 1.5 wt % $Ag/TiO_2$ catalyst was prepared as follows: 180 g $TiO_2$ powder was mixed with 75 g aqueous $AgNO_3$ solution containing 3.5 wt % Ag. The mixture was kneaded to a paste, which was extruded. The extrudates were dried at 150° C. for 3 h, hereafter calcined at 525° C. for 2 h. The Ag content of the sample was analyzed by ICP as 1.5 wt % Ag. For the catalytic test, the extrudates were crushed to a particle size of 150-300 µm. The results are shown in Table 12.

TABLE 12

| 1.5 wt % $Ag/TiO_2$ Catalyst: | | |
|---|---|---|
| Temperature | deg C. | 185 |
| Pressure | Bar | 28 |
| Catalyst volume | ml | 0.260 |
| Space velocity, wet | Nl/h/m3 | 57500 |

TABLE 12-continued

| INLET GAS COMPOSITION WET: | | |
|---|---|---|
| $H_2$ | % | 53.1 |
| CO | % | 27.4 |
| $CO_2$ | % | 0 |
| $H_2O$ | % | 19.5 |
| HCN in wet gas | ppb | 11088 |
| HCOOH | ppb | 13422 |
| EXIT GAS COMPOSITION WET: | | |
| CO | % | 27.4 |
| HCN | ppb | 1514 |
| HCOOH | ppb | 703 |
| CO ratio | | 1.000 |
| HCN ratio | | 0.137 |
| HCOOH ratio | | 0.052 |

It can be seen from Table 12 that the content of hydrogen cyanide, formic acid and formic acid derivatives was reduced.

Example 12

An $Ag/Al_2O_3$ catalyst was prepared as follows: 50 g $Al_2O_3$ extrudates were impregnated to incipient wetness with a solution of 1.58 g $AgNO_3$ in 37.5 ml $H_2O$. The sample was dried at 110° C., hereafter calcined at 500° C. for 2 h. The Ag content of the sample was analyzed by ICP as 1.9 wt %. For the catalytic test, the extrudates were crushed to a particle size of 150-300 µm. The results are shown in Table 13.

TABLE 13

| 1.9 wt % $Ag/Al_2O_3$ Catalyst: | | |
|---|---|---|
| Temperature | deg C. | 185 |
| Pressure | Bar | 11 |
| Catalyst volume | ml | 0.315 |
| Space velocity, wet | Nl/h/m3 | 50100 |
| INLET GAS COMPOSITION WET: | | |
| $H_2$ | % | 50.4 |
| CO | % | 26.0 |
| $CO_2$ | % | 0 |
| $H_2O$ | % | 23.6 |
| HCN in wet gas | ppb | 9777 |
| HCOOH | ppb | 17032 |
| EXIT GAS COMPOSITION WET: | | |
| CO | % | N/A |
| HCN | ppb | 6879 |
| HCOOH | ppb | 8260 |
| CO ratio | | N/A |
| HCN ratio | | 0.704 |
| HCOOH ratio | | 0.485 |

It can be seen from Table 13 that the content of hydrogen cyanide, formic acid and formic acid derivatives was reduced.

Example 13

An Pd—Pt/$Al_2O_3$ catalyst was prepared as follows: 50 g $Al_2O_3$ extrudates were impregnated to incipient wetness with a solution of 0.68 g [Pd(NH$_3$)$_4$](HCO$_3$)$_2$ and 0.28 g [Pt(NH$_3$)$_4$](HCO$_3$)$_2$ in 37.5 ml $H_2O$. The sample was dried at 110° C., hereafter calcined at 500° C. for 2 h. The metal content of the sample was analyzed by ICP as 0.49 wt % Pd and 0.28 wt % Pt. For the catalytic test, the extrudates were crushed to a particle size of 150-300 µm. The results are shown in Table 14.

TABLE 14

0.49 wt % Pd—0.28 wt % Pt/$Al_2O_3$ Catalyst:

| | | |
|---|---|---|
| Temperature | deg C. | 185 |
| Pressure | Bar | 28 |
| Catalyst volume | ml | 0.326 |
| Space velocity, wet | Nl/h/m3 | 45800 |
| INLET GAS COMPOSITION WET: | | |
| $H_2$ | % | 53.1 |
| CO | % | 27.4 |
| $CO_2$ | % | 0 |
| $H_2O$ | % | 19.5 |
| HCN in wet gas | ppb | 7753 |
| HCOOH | ppb | 13422 |
| EXIT GAS COMPOSITION WET: | | |
| CO | % | 27.4 |
| HCN | ppb | 2093 |
| HCOOH | ppb | 2535 |
| CO ratio | | 1.000 |
| HCN ratio | | 0.270 |
| HCOOH ratio | | 0.189 |

It can be seen from Table 14 that the content of hydrogen cyanide, formic acid and formic acid derivatives was reduced.

Example 14

An Ag/ZnO catalyst was prepared as follows: 100 g ZnO extrudates were impregnated to incipient wetness with a solution of 3.16 g $AgNO_3$ in 35.0 ml $H_2O$. The sample was dried at 110° C., hereafter calcined at 500° C. for 2 h. The Ag content of the sample was analyzed by ICP as 2.0 wt %. For the catalytic test, the extrudates were crushed to a particle size of 150-300 μm. The results are shown in Table 15.

TABLE 15

2.0 wt % Ag/ZnO Catalyst:

| | | |
|---|---|---|
| Temperature | deg C. | 185 |
| Pressure | Bar | 28 |
| Catalyst volume | ml | 0.173 |
| Space velocity, wet | Nl/h/m3 | 86700 |
| INLET GAS COMPOSITION WET: | | |
| $H_2$ | % | 53.2 |
| CO | % | 27.4 |
| $CO_2$ | % | 0 |
| $H_2O$ | % | 19.4 |
| HCN in wet gas | ppb | 7714 |
| HCOOH | ppb | 13354 |
| EXIT GAS COMPOSITION WET: | | |
| CO | % | 27.4 |
| HCN | ppb | 816 |
| HCOOH | ppb | 4268 |
| CO ratio | | 1.000 |
| HCN ratio | | 0.106 |
| HCOOH ratio | | 0.320 |

It can be seen from Table 15 that the content of hydrogen cyanide, formic acid and formic acid derivatives was reduced.

Example 15

A Pd/$MoO_3$/$Al_2O_3$ catalyst was prepared as follows: 220 g $Al_2O_3$ extrudates were added to a suspension of 108 g $MoO_3$ in 700 ml $H_2O$. The mixture was heated to reflux for 16 h causing absorption of $MoO_3$ on the $Al_2O_3$ surface. The extrudates were isolated by filtration, and dried at 110° C. and calcined at 450° C. for 2 h. Hereafter 100 g $MoO_3$/$Al_2O_3$ extrudates were impregnated to incipient wetness with a solution of [Pd($NH_3$)$_4$](HCO$_3$)$_2$ in diluted nitric acid. The sample was dried at 110° C., and calcined at 500° C. for 2 h. The Pd content of the sample was analyzed by ICP as 0.87 wt %. For the catalytic test, the extrudates were crushed to a particle size of 150-300 μm. The results are shown in Table 16.

TABLE 16

0.87 wt % Pd/$MoO_3$/$Al_2O_3$ Catalyst:

| | | |
|---|---|---|
| Temperature | deg C. | 185 |
| Pressure | Bar | 28 |
| Catalyst volume | ml | 0.237 |
| Space velocity, wet | Nl/h/m3 | 63400 |
| INLET GAS COMPOSITION WET: | | |
| $H_2$ | % | 53.2 |
| CO | % | 27.4 |
| $CO_2$ | % | 0 |
| $H_2O$ | % | 19.4 |
| HCN in wet gas | ppb | 7714 |
| HCOOH | ppb | 13354 |
| EXIT GAS COMPOSITION WET: | | |
| CO | % | 27.4 |
| HCN | ppb | 59 |
| HCOOH | ppb | 970 |
| CO ratio | | 1.000 |
| HCN ratio | | 0.008 |
| HCOOH ratio | | 0.073 |

It can be seen from Table 16 that the content of hydrogen cyanide, formic acid and formic acid derivatives was reduced.

Example 16

A high load Ag/$TiO_2$ catalyst was prepared as follows: 20 g $TiO_2$ extrudates were impregnated to incipient wetness with 7.0 ml of an aqueous solution containing 7.85 g $AgNO_3$. The sample was dried at 110° C., and calcined at 500° C. for 2 h. The Ag content of the sample was analyzed by ICP as 18.4 wt %. For the catalytic test, the extrudates were crushed to a particle size of 150-300 μm. The results are shown in Table 17.

TABLE 17

18.4 wt % Ag/$TiO_2$ Catalyst:

| | | |
|---|---|---|
| Temperature | deg C. | 185 |
| Pressure | Bar | 28 |
| Catalyst volume | ml | 0.204 |
| Space velocity, wet | Nl/h/m3 | 73600 |
| INLET GAS COMPOSITION WET: | | |
| $H_2$ | % | 53.2 |
| CO | % | 27.4 |
| $CO_2$ | % | 0 |
| $H_2O$ | % | 19.4 |
| HCN in wet gas | ppb | 11088 |
| HCOOH | ppb | 13422 |
| EXIT GAS COMPOSITION WET: | | |
| CO | % | 27.4 |
| HCN | ppb | 665 |
| HCOOH | ppb | 1358 |
| CO ratio | | 1.000 |
| HCN ratio | | 0.060 |
| HCOOH ratio | | 0.101 |

It can be seen from Table 17 that the content of hydrogen cyanide, formic acid and formic acid derivatives was reduced.

The invention claimed is:

1. A process for the removal of hydrogen cyanide, formic acid and formic acid derivatives from synthesis gas comprising these compounds, carbon monoxide and hydrogen, the process comprising contacting the synthesis gas with a catalyst comprising one or more metals selected from the group consisting of silver, gold, palladium, platinum and their mixtures and supported on a carrier comprising at least one of the oxides of scandium, yttrium, lanthanum, cerium, titanium, zirconium, aluminium, zinc, chromium and molybdenum, to remove the formic acid by catalytic non-oxidative decomposition and to remove the hydrogen cyanide by catalytic hydrolysis of hydrogen cyanide to carbon monoxide and ammonia, and wherein hydrogen cyanide is decomposed to carbon monoxide and ammonia and formic acid is decomposed to carbon dioxide and hydrogen.

2. A process according to claim 1, wherein the catalyst comprises 0.01 to 40 wt % of the one or more metals.

3. A process according to claim 2, wherein the catalyst comprises 0.05 to 20 wt % of the one or more metals.

4. A process according to claim 1, wherein the one or more metals is selected from the group consisting of palladium and silver, and the carrier comprises at least one of the oxides of cerium, titanium, zirconium, aluminum and molybdenum.

5. A process according to claim 4, wherein the catalyst comprises silver supported on a carrier comprising titanium oxide and/or zirconium oxide.

6. A process according to claim 1, wherein the carrier is in the form of a monolith or in the form of pellets.

7. A process according to claim 1, wherein the synthesis gas is contacted with the catalyst at temperatures ranging from 150° C. to 400° C. and pressures ranging from 1-100 bars.

8. A process according to claim 1, wherein the process is carried out in a radial flow converter reactor.

9. A process according to claim 1, wherein the synthesis gas after removal of hydrogen cyanide, formic acid and formic acid derivatives, is cooled and separated into a cleaned synthesis gas stream and a condensate stream.

* * * * *